United States Patent [19]

Horstmann

[11] 4,148,079

[45] Apr. 3, 1979

[54] CORRECTION OF RAPID PERIODIC TIMING ERRORS IN THE PRODUCTION OF TAPE-RECORDED COLOR TELEVISION SIGNALS AND THE LIKE

[75] Inventor: Winfried Horstmann, Griesheim, Fed. Rep. of Germany

[73] Assignee: Robert Bosch GmbH, Stuttgart, Fed. Rep. of Germany

[21] Appl. No.: 840,217

[22] Filed: Oct. 7, 1977

Related U.S. Application Data

[63] Continuation-in-part of Ser. No. 827,990, Aug. 26, 1977, abandoned.

[30] Foreign Application Priority Data

Aug. 28, 1976 [DE] Fed. Rep. of Germany ....... 2638869

[51] Int. Cl.² .............................................. H04N 5/795
[52] U.S. Cl. .............................................. 360/36; 358/8
[58] Field of Search ................ 360/36, 26, 51; 358/8, 358/127

[56] References Cited

U.S. PATENT DOCUMENTS

| | | | |
|---|---|---|---|
| 3,666,880 | 5/1972 | Krause | 360/36 |
| 3,900,885 | 8/1975 | Tallent et al. | 358/8 |
| 3,909,839 | 9/1975 | Inaba et al. | 360/36 |
| 3,931,638 | 1/1976 | Lentz | 360/36 |
| 4,007,486 | 2/1977 | Inaba et al. | 358/8 |
| 4,053,926 | 10/1977 | Lemoine et al. | 360/36 |
| 4,054,921 | 10/1977 | Tatami | 360/36 |
| 4,063,284 | 12/1977 | Tatami | 360/36 |
| 4,065,787 | 12/1977 | Owen et al. | 358/127 |
| 4,069,499 | 1/1978 | Ninomiya | 360/36 |
| 4,118,738 | 10/1978 | Arnstein | 360/36 |
| 4,120,000 | 10/1978 | Ninomiya | 360/36 |

FOREIGN PATENT DOCUMENTS 45-27413   9/1970   Japan ................................... 360/36

OTHER PUBLICATIONS

Acker et al., Digital Time-Base Correction for Video Signal Processing, J. of SMPTE, vol. 85, 3/76, pp. 146-150.
Edwardson et al., The Digital Time-Correction of Video Tape Recorded Color Television, Proceedings of the Conf. on Video and Data Recording, Birmingham, Eng., 10-12 Jul. 73, pp. 27-39.

*Primary Examiner*—Raymond F. Cardillo, Jr.
*Attorney, Agent, or Firm*—Flynn & Frishauf

[57] ABSTRACT

Timing errors are detected by phase comparison of the color carrier at the line scanning frequency repetition rate and the errors so successively determined for one oblique track on the tape are loaded into an intermediate register. While a second magnetic head of the reproducer performs the same operation on the next track, the errors stored in the intermediate register are subtracted from their average value produced by an integrator and loaded into a final storage register, of which there is one for each track of a line packet, but only after being combined, in a noise-scrubbing process, with an error value previously stored in a corresponding location in that register so as to provide a suitable moving average. During the next period in which the intermediate storage register is loaded with the errors relating to another track, all of the main storage registers are read, providing as many pulses as there are tracks in a pakcet for recurrent correction of timing errors within the period of one television line.

7 Claims, 3 Drawing Figures

Fig. 1

Fig. 2
(ONE CCT. FOR EA. OF 2 HEADS 21, EXCEPT THAT 36, 37 & 38 ARE COMMON)

Fig. 3

CORRECTION OF RAPID PERIODIC TIMING ERRORS IN THE PRODUCTION OF TAPE-RECORDED COLOR TELEVISION SIGNALS AND THE LIKE

This application is a continuation-in-part of my application filed Aug. 26, 1977 Ser. No. 829,990, now abandoned.

This invention concerns method and apparatus for correcting rapid periodic time errors in the reproduction of signals from a dynamic signal storing device such as a moving magnetic tape. More particularly, it concerns signals such as color television signals in which a reference carrier wave such as the color carrier and periodic synchronizing signal such as the line and field synchronizing signals of a television signal are recorded along with the remainder of an information signal such as a television signal.

Color television signals have a relatively wide frequency band and the storage of such signals on magnetic tape correspondingly requires great relative velocity between the electromagnetic transducers (magnetic heads) and the dynamic signal storing device or record carrier (magnetic tape). In order to obtain such high relative velocities, the systems in use have generally provided magnetic heads mounted on a rapidly revolving head disk past the circumference of which a relatively slowly running magnetic tape moves, so that the magnetic heads scan the tape at an angle to the lead line of the tape. The stored information is accordingly held on the tape in a sequence of parallel closely packed oblique track sections and it can be picked up again therefrom by an apparatus similar to that used for recording.

Although such apparatus is useable for a variety of wideband information signals, it is used particularly for recording television signals. In a particular known system, a relatively broad magnetic tape is bent into a trough and it is scanned by contact on its inner side by a rapidly revolving head rotor on the circumference of which four electromagnetic transducers, also called magnetic heads, are provided that are successively offset by 90°. The magnetically effective poles of the magnetic heads extend a certain amount beyond the edge of the head wheel and thus obtain a certain necessary contact pressure on the magnetizeable layer of the magnetic tape. As the result of the great circumferential velocity of the head wheel and the relatively small tape transport velocity, the stored information is held in a series of parallel track sections approximately perpendicular to the longitudinal direction of the magnetic tape.

In other known systems, the head wheel equipped with one or more magnetic heads rotates in the ring race of a perpendicularly subdivided fixed or rotatably mounted guide cylinder around which is wound, in a helicoidal manner, a relatively narrow magnetic tape. Here also, the circumferential velocity of the head wheel is substantially higher than the tape transport velocity, but in this case the track sections described by the magnetic head or heads on the tape run at a much more oblique angle to the longitudinal direction of the tape than in the first-mentioned recording system as the result of the helical winding about the head wheel, so that each track section represents the content of a television picture or a considerable portion thereof.

In the reproduction of television signals recorded in these ways, there are strict requirements regarding timing accuracy. The timing must correspond exactly to the timing relations involved in the recording operation. Larger timing errors lead to synchronizing errors of the television receiver connected to the reproducer, while smaller timing errors are noticeable in the picture as chromaticity aberrations. Great efforts have therefore been made to equalize the movement relations of head wheel and magnetic tape upon recording and reproduction, respectively, or else to provide a compensating correction. For such a correction, the synchronizing signals contained in the composite television signal may be brought into agreement with respect to frequency and phase with a studio timing or clock signal. The elimination of errors that are present is usually accomplished in three steps. First by means of an electromechanical drive and related control circuits, the timing errors are approximately eliminated. As the result of the inherent inertia of such a drive and control system, the complete elimination of a timing error is not possible even at great expense and complication by such a system. A residual error remains that can be reduced further only by electronic methods. For that purpose, by comparing the phase of the respective line synchronizing signals obtained from the magnetic tape and obtained from a studio source, an error signal is obtained and delay circuits of variable delay in the signal channels are then modified in response to the error signal in the sense necessary to reduce the timing error in the delayed signal. This timing error correction is in general sufficient for the reproduction of black and white television pictures, but not for the reproduction of color television. Accordingly, in the latter case, after the above-mentioned electronic correction, there is also performed a phase comparison of the oscillations of the color synchronizing signal with those of a comparable studio source and the error signal so obtained is then once again used to control the variable delay, usually the propagation time, of a delay circuit interposed in the television signal channel.

After the last-described correction, the timing error at the beginning of each line amounts to only a few nanoseconds, corresponding to a few degrees of a color carrier oscillation, which can be tolerated. A circuit of this type is disclosed in, among others, U.S. Pat. No. 3,100,816. Since the clock or time reference signals serving for correction of the timing errors are available only at the beginning of each line and the regulation circuits available for correction run freely until the appearance of the next clock signal, increasing time reference errors can creep in during the course of a line, which lead to increasing coloration errors progressing from left to right in the color television picture. Along with the absolute time deviation of the composite color television signal reproduced from the magnetic tape with respect to the timing reference (clock) signal, the velocity differences which produce this deviation themselves contribute to the timing error found between line beginnings.

German Pat. No. 1 512 112 and likewise U.S. Pat. No. 3,428,745 disclose a time reference error correction system that produces an error signal that eventually takes account of the error-producing tendency of the velocity errors from the beginning to the end of a line, by means of a difference-forming device at the output of the correction circuit that carries out a phase comparison between the color synchronization signals and utilizes the resulting steps of the error voltage signal for generating a difference signal proportional thereto, to construct an error signal therefrom. This known circuit accordingly operates satisfactorily when the tendency of the velocity error is substantially unchanged from the beginning to the end of the same television line. In spite of the large relative velocities with which the magnet heads scan the surface of the magnetic tape, the recorded wavelengths are in part so small in the recording of television signals that they can be properly recorded and reproduced only when the magnetic heads stay in direct contact with the surface of the magnetic tape. The magnetic heads are accordingly so arranged on the surface of the revolving head disks that they project radially and elastically deform the tape while in contact therewith. In the case of the intermittent method of operation described in the foregoing introduction, therefore, each magnetic head dips into this deformation beginning at one edge of the tape and leaves it in the neighborhood of the opposite edge of the magnetic tape. The mechanical impacts occurring in rapid succession can excite the tape into very high frequency elastic vibrations in the track-scanning direction. In that way, there result velocity errors of a very high frequency type, such that the tendency of this velocity error can change very substantially in the course of a single line length. These errors cannot be eliminated by use of the known methods and apparatus for correcting time basis errors and velocity errors.

It is accordingly an object of the present invention to provide a method and an apparatus for the correction of rapidly changing periodic errors in the reproduction of color television signals from magnetic signal storage devices.

SUMMARY OF THE INVENTION

Briefly, the phase of the reference carrier wave reproduced by the signal storing device is compared with a local reference carrier wave to produce a series of raw timing error signals, at the line synchronizing pulse rate which are then stored in an intermediate storage register having as many cells as there are synchronizing pulses in one line of the set of lines making up a complete cycle of signals (in the case of color television, one picture field). At the same time, the same timing error signals are integrated to provide an average value thereof averaged over the period corresponding to one track of the set of tracks making up a complete cycle. Then, usually while another magnetic reproducing head of the head wheel scans another line and a duplicate apparatus performs the steps just mentioned, the timing error signals stored in the above-mentioned intermediate memory cells are sequentially retrieved in order to storing at the synchronizing signal rate and the retrieved signals are compared as they are retrieved with the above-mentioned average value signal to produce normalized timing error signal pulses, again at the rate of the line synchronizing pulses. The normalized timing error signal pulses, as they are produced, are compared with corresponding pulses, if any, stored in a previous cycle and each train is stored in a different main register also having a number of cells equal to the number of synchronizing pulses recorded in one track of the set of tracks of a signal storing cycle, but this comparison signal is not stored until it has been added, in weighted proportion, to the corresponding pulse stored in a previous cycle in the same memory cell array, the sum signal being what is actually stored in each cell of the array. In the intervals between loading the main registers, which is to say while in the duplicate system corresponding to the other magnetic head one of the similarly disposed registers is being loaded, all of the quiescent set of main registers are read, reading one cell of each register in turn, the cells of any one register being read in the order in which they were written, taking advantage of a time stagger corresponding to that of the original raw error signals produced by phase comparison to obtain as many retrieved sum pulses per synchronizing pulse intervals as there are record tracks in a cycle and these pulses are then used to make timing corrections of signals reproduced from the record medium, preferably by controlling the delay time of a propagation time delay circuit which is interposed in the path of the reproduced signals. Since the timing correction information is obtained from the phase comparison operation on the color carrier as a reference wave, the precise timing of the synchronizing signals for operating the reading circuits is not so critical and synchronizing signals separated from the reproduced signals in the usual way may be used instead of signals from a local source phased to correspond on the average with the reproduced ones. Delayed or frequency-multiplied pulse trains derived from synchronizing signals may likewise be used in the final reading operation.

From the apparatus standpoint, the equipment can be summarized briefly as comprising means for producing a series of timing error signal comparing the reference carrier wave reproduced from the record with a locally generated reference carrier wave, means for producing trains of timing error pulse signals at the rate of synchronizing pulses and for normalizing the pulses of each train as deviations from the average pulse magnitude over a train period, each pulse train having as many pulses as there are synchronizing pulses in a track of the set of tracks forming a record cycle, meaning a television picture field in the case of television signals, means for storing signals derived from successive pulse trains, train by train in as many storage cell arrays as there are recorded lines in a cycle of lines, means for reading the storage cell arrays in a sequence reading a cell from each array in turn before reading another cell of the same array, so that each cell is read as many times as there are record tracks in a cycle of tracks before the cell content is rewritten by signals derived from another pulse train and, finally, the now conventional variable delay circuit controlled by time correction pulses which is, however, in this case controlled by a plurality of pulses within each interval between successively reproduced synchronizing pulses, i.e. within each television line scanning interval.

The ability to correct time errors several times within a line scanning interval, which is a characteristic advantage of the present invention, is based on the recognition that velocity errors and head-to-tape pressure and spacing errors of neighboring tracks are essentially the same and that the synchronizing signals of neighboring tracks, resulting from the subdivision of the cycles, i.e. of a television picture, into a number of tracks obliquely crossing the tape, are staggered with respect to each other in their distances from the tape edge.

The invention is described in further detail by way of illustrative example with reference to the annexed drawings, in which.

Figure 1:
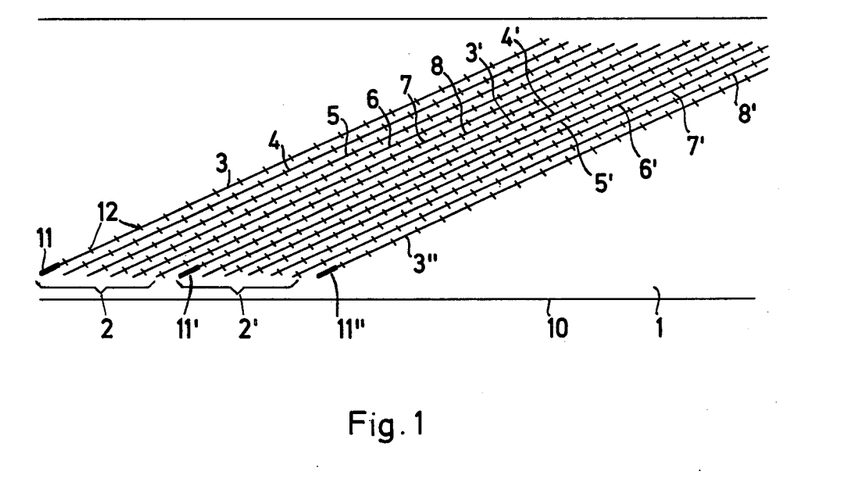
FIG. 1 is a diagram of the disposition of track segments recorded on a magnetic tape showing locations where synchronizing signals are recorded.

FIG. 1 shows a magnetic tape 1 in which a series of successive track segments 3,4,5,6,7,8; 3',4',5',6',7',8'; 3"..., all making the same angle with the tape edge 10, contain color television information including the synchronizing signals forming part of the composite television signal, namely the vertical synchronization signals 11, 11', 11" and horizontal synchronization signals 12. A set of six successive track segments, such as the set 3,4,5,6,7,8 or the set 3',4',5',6',7',8', represent the content of one color television picture field and are collectively regarded as a so-called line packet, as indicated symbolically by the brackets showing the content of the line packets 2 and 2' respectively. According to the color television system specified by the EBU standard, a full television picture field is represented by 625 lines. In recording such a color television picture by means of an oblique track tape recorder with 180° envelopment of a head wheel having two magnetic heads at opposite positions of its periphery, under the system illustrated in FIG. 1 of recording a picture in six track segments making up a packet, it follows that the length of one track is 52 and 1/12 television picture lines. In every head wheel revolution, therefore, 104 and one-sixth lines will be written and with 6 head wheel revolutions, 625 lines. As the result of the arrangement of two diametrically oppositely located magnetic heads on the circumference of the head disk, it follows that with every revolution six tracks will be written by one magnetic head and six more tracks interleaved with the first six will be written by the other magnetic head.

In FIG. 1, for reasons of clarity, only those tracks that are recorded on the tape by a particular one of the magnetic heads are shown. Each track there shown accordingly contains slightly more than 52 lines and the offset or stagger of the horizontal synchronizing signals of two successive tracks obliquely away from the tape edge amounts to one-sixth of a line.

The invention is based upon the recognition that periodic timing errors that are based on the influences of the mechanical contact relations between magnetic tape and magnetic head repeat themselves more or less exactly after a revolution for each individual magnetic head. In other words, the error curve referred to a distance along the track, beginning from one tape edge, has essentially the same course for all the tracks of a particular magnetic head. Since the horizontal synchronizing signals of a line packet written by one head are shifted from track to track away from the tape edge by a sixth of a picture line length, it is now possible, by carrying over the geometrical location of the horizontal synchronizating signals of five previous tracks to the sixth track to determine the magnitude of the velocity error not only at the picture line beginning, but also five times more during the course of the line.

Figure 2:
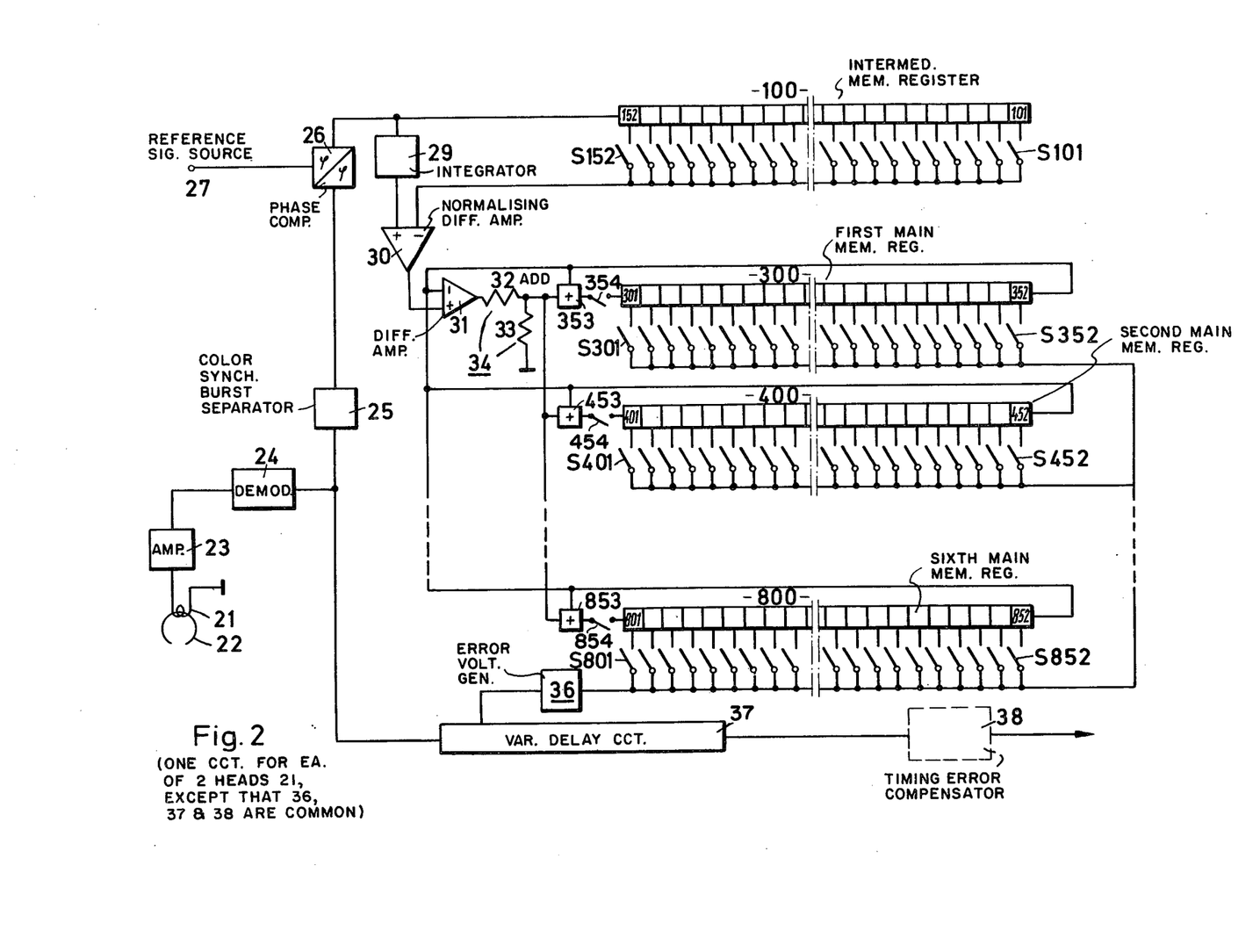
FIG. 2 is a block diagram of an apparatus for carrying out the method of the present invention.

FIG. 2 shows a circuit organization of an illustrative embodiment for carrying out the method of the invention. The color television information stored on the magnetic tape (not shown) mostly by the frequency modulation is picked up by the winding 21 of the magnetic head 22 and boosted by the amplifier 23 to a level that makes possible further processing. The signal is demodulated in demodulator 24 and the color synchronizing signal is fished out of the composite signal in the burst separator 25. In the phase comparison circuit 26, a phase comparison takes place between the oscillations of the color synchronizing signal obtained from the magnetic tape with oscillations of a reference signal source 27 that delivers an accurate color synchronizing signal. At the output of the phase comparison circuit 26 is connected a memory register 100 with 52 storage cells 101 ... 152. Each storage cell 101 to 152 is connected through an individual switch S101 to S152 with the input of a differential amplifier 30. The switches S101 to S152 are, for purposes of simplified representation, drawn as mechanical switches. Of course, in this type of circuitry semiconductor devices are primarily used. In fact, since one cell is to be read at a time, and only once, the track memory 100 may be a shift register and it may be read as well as loaded by shifting, but it is not necessary that a shift register type storage of periodic samples of the output of the phase comparison circuit 26 should be provided and in this place other types of memories that fulfill the purposes above explained may be used.

The output signal of the phase comparison circuit 26 is at the same time supplied to the integration circuit 29. The output of the integration circuit 29 is supplied to one input of the differential amplifier 30. The 52 storage positions of the intermediate memory 100 can be connected to the other input of the differential amplifier sequentially, this being shown in FIG. 2 by the correspondingly many switches S101 to S152, the control circuits of which are omitted to simplify the drawing. The output signal of the differential amplifier 30 is supplied to another differential amplifier 31, from the output of which it goes through the attenuation network 34 composed of the resistances 32 and 33 to the addition stage 353 (actually to a set of addition stages 353,453 ... 853 as will be presently discussed). The output of the addition stage 353 is furnished to a memory 300 the output of which, shown as coming from the last cell (where an output is available as the memory is progressively filled, pushing out a previous content cell by cell), is connected back to the second input of the addition stage 353 and the second input of the differential amplifier 31 simultaneously. The fifty two storage cells 301 to 352 of the memory 300 are connected individually through an equal number of switches S301 to S352 to the input of the error voltage generator 36 that serves to control the variable dalay circuit 37. As will be mentioned later, the memory 300 must be non-destructively read several times before it is reloaded, so that it cannot be read by shifting out its contents to control the circuit 36, but only by sequentially closing each of the switches S301 to S352. The signal from the demodulator 24 is passed through the variable delay circuit 37, after which it is practically free from rapidly varying velocity errors and can thereafter be further processed by a conventional timing error compensator 38 that is not within the present invention and does not need to be further described here.

In parallel to the above-described memory 300 are five more memories 400 to 800, each corresponding to another track of the six tracks of the line packet. Each of these memories stores the velocity error signals belonging to the track to which it corresponds.

The operation of the circuit of FIG. 2 will now be considered. The winding 21 of the reproducer magnet head 22 provides a signal that is amplified in the amplifier 23, and then supplied to the demodulator 24. The demodulated signal is supplied to a burst-separator stage 25 in which the color carrier oscillations of the color synchronizing signal are filtered out. These pulse sequences are supplied to the phase comparison circuit 26 of which the second input is connected with a reference signal source that likewise provides oscillations of the color synchronizing signal, this time of studio quality. At the output of the phase comparison circuit 26, there accordingly appears an error signal the magnitude of which depends upon the magnitude of the phase deviation between the two signal sources.

The signal obtained from the magnetic tape can be affected with slow velocity errors as well as with rapid periodic velocity errors. Slow velocity errors may for example be produced by non-uniformities of the tape drive. There may also be noise components which are superimposed upon the periodic errors. For this reason, the error signal obtained by the phase comparison in the phase comparison circuit 26 cannot be directly put into the main storage registers (memories) 300 to 800 and then taken for controlling the variable delay network 37. Instead, the above-mentioned additional errors must be eliminated in order that the velocity errors will repeat themselves with sufficient precision. For this purpose, the error signal obtained from the phase comparison circuit 26 is first supplied to the intermediate storage register 100 that has as many storage cells as there are television lines in a track. The writing of the error signal magnitudes into the storage cells 101 to 152 of the intermediate memory 100 occurs line by line during the reading out of a track by the magnetic head 22 that is connected with the circuit shown. Concurrently with the writing of the error values into the intermediate storage register 100, the error signal is supplied to the integration circuit 29 which forms the average value of the entire group of error values. In the time during which the second magnet head, not shown in the drawing, reads out another track, the processing of which takes place in another circuit that is exactly the same as the circuit of FIG. 2, the stored error values already in the intermediate storage register 100 are read out one by one and compared with the average error magnitude of the most recently completely read track. The error signal available at the output of the differential amplifier 30 is therefore free of slow velocity errors that can result from nonuniformities of the tape drive. It is, however, still overlain by noise, i.e. random variations of the error magnitude. This error signal is therefore not supplied in full magnitude to the main storage registers made available for each track of a line packet. Instead, the error value for one line as it comes out of the differential amplifier 30 is read out together with the previously stored value for a corresponding line of a corresponding track for submission to the two respective outputs of a second differential amplifier 31. The difference amount thus obtained is then supplied through an attenuation network 34 in successive operations to the addition stage 353,453 . . . 853 and there added to a suitable fraction of the previously stored error value. In this manner, only the straightened error magnitudes are stored in the main storage registers 300 to 800. They are each a sort of moving average of a set of corresponding previous error values.

The main storage registers 300 to 800, just like the intermediate storage register 100, are composed of fifty-two storage cells 301 to 352, 401 to 452, . . . 801 to 852. Each storage cell can be reached individually through the corresponding switches S301 to S352, S401 to S452, . . . S801 to S852.

For elimination of the velocity errors that have rapid changes of the error size, the storage register cell switches are successively closed during the reading out of the track from the tape in the following sequence: S301 to S801, S302 to S802 and so on. As this is done, the error magnitudes stored in the corresponding storage cells are supplied to the error voltage generator 36 which correspondingly sets the delay time of the controllable delay network 37 to correspond with the error magnitude currently supplied to the input to the circuit 36. On account of the stagger of the individual tracks of a line packet relative to the tape edge, it is possible in this way to correct the velocity errors in magnitude and direction a number of times during the course of a single line.

As already explained, the reading out of raw error magnitudes stored in the intermediate storage register 100 and their processing takes place while the magnet head 22 is away from the tape and another head is reading a track causing raw error values to be written into its own intermediate storage register in a duplicate of the circuit of FIG. 2 (the circuit 36 and the delay network 37, of course, is not duplicated and are common to both). Both the normalizing of the raw error values by the differential amplifier 30 and the straightening or "scrubbing" of the normalized error values by the differential amplifier 31 and the active addition circuit 353,453, . . . , or 853, and of course the storing of the scrubbed error values in a main storage register occur concurrently with the reading out of the contents of the intermediate storage register 100.

The fifty-two scrubbed error values processed from one intermediate register load of raw values are of course inserted into only one of the six main storage registers. Consequently, switching connections must be made to enable the correct main storage register to be loaded, as symbolized by the switches 354,454, . . . 854. If the main storage registers are operated as shift registers, these storage register selections may also switch to the active register the clock pulses for shifting the error values from cell to cell as the error values are supplied by the addition circuit at the writing input. Thus, only the storage register into which error values are being written will shift out a corresponding previous value from the other end of the register to the corresponding addition circuit and to the inverting input of the differential amplifier 31, so that a corresponding switching of these leads is not strictly necessary, although it may be done if desired. The control of the switches 354,454, . . ., 854 may be timed in any known way in step with every sixth revolution of the wheel or disk that carries the magnetic head 22 of the reproducer, or it may be timed by a counter that counts line synchronizing pulses and is kept properly framed by vertical synchronizing pulses, but since the selection of the main storage registers is strictly a matter of allocating the registers to the several tracks on the tape which make up a line packet, switching control in accordance with the movement of the tape reading head is adequate and simpler. For control of semiconductor switches, fast and accurate control by the movement of the magnetic head can be provided in a variety of known ways, such as photoelectrically or inductively, without the difficulties of mechanical commutation.

When the intermediate register 100 is a shift register, it can be read out by stepping it along as well as by sequentially closing switches to the several cells, and of course it will have to be stepped along if it is to be loaded over a single input lead as shown in FIG. 2, where it is to be understood that the necessary clock pulses are provided. Reproduced line synchronizing signals may be used to provide all the necessary reading switch control operations, as well as clock pulses if needed for stepping the shift registers, because the actual error values are produced by the phase comparator 26 and entering these values in step with the reproduced line synchronizing pulses (separated by other stages not shown in FIG. 2) would be appropriate. The reading out of the register 100 can likewise be done in step with the line synchronizing pulses received by the other magnetic head, not shown in FIG. 2, while the head 22 is travelling away from the tape, even though these are offset by one-twelfth of a line. These same pulses of course would time the writing of scrubbed pulses into the selected main storage register.

The reading of the main storage registers, however, requires additional control pulses, since all of the main storage registers must be read during each period in which the intermediate storage register 100 is being filled. The synchronizing pulses being received while the intermediate storage register 100 is being filled will correspond to the proper timing for reading one of the main storage registers served by that particular intermediate storage register, namely the one which will be filled in the next interval between refilling of the intermediate storage register. Each of these pulses, therefore, may be used to read the already stored content of that register into the circuit 36 and may also be used to start a chain of five monostable 1/6 line-period timing circuits each of which will produce a reading command pulse for the next main storage register in sequence. The distribution of each series of reading command pulses from cell to cell of the respective storage registers can be done by counters. If desired, however, a pulse generator operating at six times the line frequency can be used with an appropriate chain of counters for controlling the reading pulses of the various registers. In that case, the reproduced synchronizing pulses received during the reading of the main storage registers may be used merely for a correction of the timing of every sixth pulse as part of a "fine" frequency control for the pulse generator.

During the period in which one of the main storage registers 300,400, . . ., 800 is being reloaded, the duplicate array of main storage registers associated with the other magnetic head not shown in FIG. 2 is being read to control the same variable delay network 37 shown in FIG. 2, preferably acting through the same error voltage transferring or generating circuit 36 also shown in FIG. 2.

Because the effect of slowly changing velocity errors resulting mainly from nonuniformity in the tape drive was eliminated in the normalizing comparison provided by the integrator 29 and the differential amplifier 30, it is necessary to provide correction of these more slowly varying timing errors for the video signals coming out of the time delay network 37. This can be done with known timing error compensation devices and such a device is indicated by the dashed-line block 38 in FIG. 2. As these devices are well known and are not part of the present invention, they do not need to be further described here.

Since the various timing error signals stored in the various registers are not binary values but generally either analog or multilevel values, each register cell is not a one-bit cell, but rather either an analog cell, such as one storing a charge on a capacitor, or multibit digital cell, storing a number n representative of the error value in a plurality of subcells, either as a train of n pulses, as is common in pulse peak voltage analyzers, or, conceivably, storing the number n in binary, reflected binary or bcd code, or the like.

Figure 3:
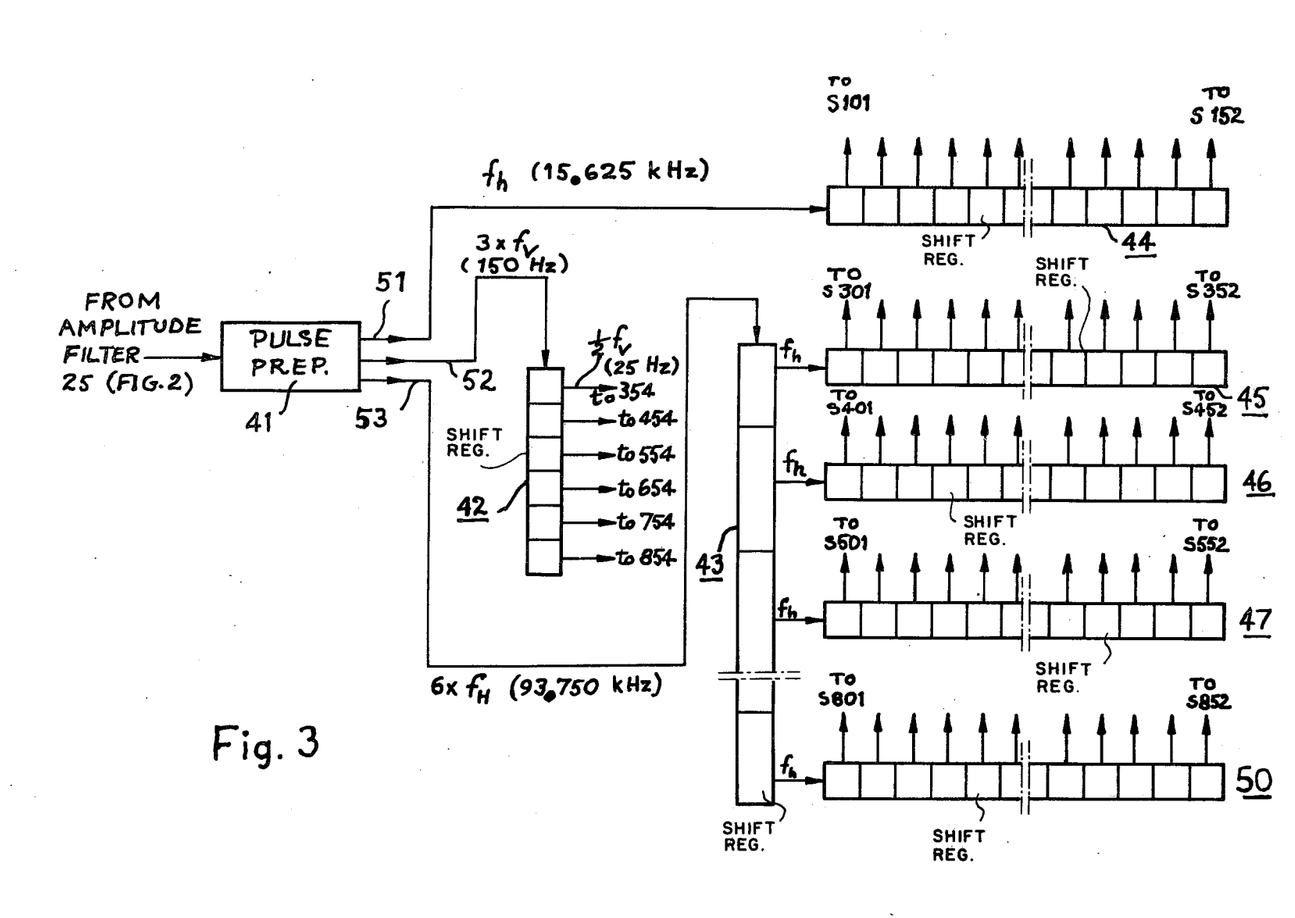
FIG. 3 is a block diagram illustrating the control of the memories in the apparatus of FIG. 2.

Description of FIG. 3

The arrangement according to FIG. 3 represents, in the form of a block circuit diagram, the control of the memories. This arrangement consists essentially of a pulse preparation stage 41 and, connected behind it, shift registers 42,43,44 and 45 to 50. Of these shift registers the registers 42,43 and 44 are individually connected with different outputs of the pulse preparation stage 41, while the shift registers 45 to 50 are individually connected with different outputs of the shift register 43.

The manner of operation of the arrangement described is briefly as follows:

The pulse preparation stage 41 receives its input pulses from the output of the burst separator (amplitude filter) 25. At the three outputs of the pulse preparation stage 41, three different pulse sequence frequencies can be obtained, thus at the output 51 a pulse sequence frequency $f_h$ that is identical with the line frequency (15,625 kHz according to the European norm); at the output 52 a pulse sequence frequency that corresponds to three times the vertical frequency (in the example 150 Hz) and at the output 53 a pulse sequence frequency that corresponds to six times the line frequency. The shift register 44 for control of the storage places of the memory 100 (FIG. 2) is connected with the output 51 of the pulse preparation stage and receives therefrom a synchronizing frequency that corresponds to the line frequency. The error signals obtained by the phase comparison in the phase comparison stage 26 are accordingly read into the memory 100 (FIG. 2) at the line frequency. The shift register 44 and likewise the registers 45 to 50 each have 52 storage places for control of the memories 100 to 800, that likewise have 52 storage places. The shift register 42 contains six storage places that are synch-pulsed at three times the vertical frequency. The switches 354,454, . . . 854 connected with the outputs of the shift register 42 are thereby actuated at the rhythm of 25 Hz that is, the time spacing of successive complete pictures, so that only the track section relevant for the respective memory is read into the latter.

The output 53 of the pulse preparation stage 41 finally delivers a pulse sequence frequency of the magnitude of six times the line frequency. The thereby actuated six-part shift register 43 accordingly steps along each of the six registers 45 to 50 connected thereto at the line frequency, while the individual switches S 301 . . . S 801, S 302 . . . S 802, and so on respectively related to the storage places of the memories 300 to 800 are switched at six times the line frequency, so that in each line six error values are made available for the correction of the phase errors produced in the device 26.

I claim:

1. A method of correcting rapid periodic time errors in the reproduction of signals including periodic synchronizing signals and a reference carrier wave, from a dynamic signal storing device on which each successive cycle of said signals are recorded as a set of record tracks in which the record of said synchronizing signals are progressively offset from line to line, comprising the steps of:

comparing the phase of the reference carrier wave reproduced from said signal storing device with a local reference carrier wave to produce raw timing error signal pulses at the recurrence rate of said synchronizing pulses;

storing the said timing error signal pulses which correspond to one of said record tracks in the respective cells of an intermediate storage register having a multiplicity of cells by writing said error signals into said register sequentially at the synchronizing signal recurrence rate;

integrating said timing error signal pulses to provide an average value thereof averaged over the period required for reading said track;

sequentially retrieving the timing error signals stored in said intermediate storage register cells in order of storing at the synchronizing signals recurrence rate and comparing said retrieved signals as they are retrieved with said average value to produce a train of normalized timing error signal pulses;

comparing each of said normalized timing error signal pulses sequentially with a corresponding pulse, if any, stored in a previous cycle, adding a signal proportional to the comparison result to a signal proportional to said corresponding pulse and storing the resulting sum signal in a first main storage register in a position in said first main storage register corresponding to the order in which said sum signal is produced, using the previously and similarly stored sum signal, if any, in said position in said first main storage register as said corresponding pulse for these comparing and adding steps;

repeating the foregoing steps as many times as necessary to store as many trains of sum signals in as many main storage registers, as there are recorded tracks in each said set of tracks, each alternate repetition utilizing a different one of two intermediate storage registers;

reading said sum signals sequentially and nondestructively by reading, in turn, one signal from a cell of each of said main registers in a substantially regular sequence in which the contents of the cells of each main register are read in the order in which they were stored, and the main registers are read in the order in which the tracks to which their contents relate were recorded and reproduced, taking advantage of the time stagger of the reading of the cells in the respective main registers to obtain as many read-out sum pulses per synchronizing pulse interval as there are record tracks in each said set of tracks, and utilizing said read-out sum pulses to produce recurring timing corrections of signals reproduced from said record.

2. A method as defined in claim 1, in which the last-mentioned step of the method is performed by controlling a delay period to which said reproduced signals are subjected by a propagation time delay circuit of which the propagation time is variable.

3. Apparatus for correcting rapid periodic time errors in the reproduction of signals including periodic synchronizing signals and a reference carrier wave from a dynamic signal storing device on which each successive cycle of said signals is recorded as a set of tracks in which the record of said synchronizing signals are progressively offset from line to line, comprising, in combination:

means for producing raw timing error signal pulses by comparing the reference carrier wave reproduced from said signal storing device with a locally generated reference carrier wave;

intermediate storage register means for storing each train of timing error signal pulses to one track of said set of tracks at the rate of said synchronizing pulses, said register means including two registers respectively arranged for storing alternate trains of error signal pulses;

means for reading out each of said pulse trains from said intermediate register means while the next one is being stored and for normalizing said pulses of each train as deviations from the average pulse magnitude of the pulse train means for storing pulse signals derived from each train of normalized pulses related to one track of said set of tracks into a different one of a set of main storage registers of which there are as many as there are tracks in said set of tracks;

means for reading said main storage registers in sequence by repetitively reading one of said derived pulse signals from each main storage register in turn and advancing in sequence to another cell of each main storage register in successive turns of reading one pulse from each main register, whereby each main storage register is read at substantially the synchronizing pulse rate during alternate track-reproducing periods, so that said derived pulses are read out from the several main storage registers at the aggregate rate of an integral multiple of the synchronizing signal recurrence rate, and means for correcting the timing error of signals reproduced from said signal storing device repetitively in response to the respective successive pulses produced by said means for reading said main storage registers.

4. Apparatus for correcting rapid periodic time errors as defined in claim 3, in which said means for reading out and normalizing raw timing error pulses comprises:

means for integrating the output of said means for producing raw timing error signal pulses to provide an average thereof for a train of said pulses corresponding to a single track of said set of tracks, and means for reading the contents of said intermediate storage register in the order and at the rate in which said register was filled after the register has been completely filled or refilled and for subtracting the stored error signal values so read from said average value signal to produce a train of pulses of normalized timing error signal values.

5. Apparatus for correcting rapid periodic time errors as defined in claim 4, in which said means for storing signals derived from a train of normalized timing error signal pulses compises:

means for comparing each pulse of said train with a corresponding pulse, if any, stored in a previous cycle and for providing an output proportional to the difference found by said comparison, and means for supplying pulse signals to be stored respectively in each of said main storage registers in response to the output of said last-mentioned means to a pulse proportional to said corresponding pulse, if any, said corresponding pulse for said comparing means and said supplying means being taken from the place of the register in which place and register the output of said supplying means is to be stored by said means for storing said derived signals.

6. Apparatus for correcting rapid periodic time errors as defined in claim 5, in which said means for reading said main storage registers comprises switching means for connecting a common reading output circuit in turn with all of the pulse signals stored in all of the main storage registers, reading an interleaved half-set of said main storage registers during alternate track-reproducing periods, said switching means for each half-set of registers being activated during periods between the processing of pulse trains read out from the respective register of said intermediate storage register means.

7. Apparatus for correcting rapid periodic time errors as defined in claim 3, in which said means for correcting the timing error of signals reproduced from said signal storing device in response to the output of said means for reading said main storage registers comprises a propagation time delay circuit of which the propagation time is variable having its input connected to a source of signals reproduced from said signal storing device and having a propagation time control input connected to the output of said means for reading said storage cell arrays.

* * * * *